US012780860B2

(12) United States Patent
Wang et al.

(10) Patent No.: US 12,780,860 B2
(45) Date of Patent: Nov. 3, 2026

(54) CYCLOPENTADIENYL LIGANDS FOR IRON CATALYSIS

(71) Applicant: UNIVERSITY OF PITTSBURGH—OF THE COMMONWEALTH SYSTEM OF HIGHER EDUCATION, Pittsburgh, PA (US)

(72) Inventors: Yiming Wang, Pittsburgh, PA (US); Yidong Wang, Yangzhou (CN); Ruihan Wang, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 556 days.

(21) Appl. No.: 18/232,866

(22) Filed: Aug. 11, 2023

(65) Prior Publication Data

US 2024/0083932 A1 Mar. 14, 2024

Related U.S. Application Data

(60) Provisional application No. 63/397,499, filed on Aug. 12, 2022.

(51) Int. Cl.
*C07F 15/02* (2006.01)
*C07F 17/02* (2006.01)

(52) U.S. Cl.
CPC .................................. *C07F 15/025* (2013.01)

(58) Field of Classification Search
CPC ............................... C07F 15/025; C07F 17/02
See application file for complete search history.

(56) References Cited

PUBLICATIONS

Y. Wang, et al. 141.50, Journal of the American Chemical Society 19594-19599(2019) ("Wang") (Year: 2019).*

* cited by examiner

*Primary Examiner* — Alexander R Pagano
*Assistant Examiner* — Frank S. Hou
(74) *Attorney, Agent, or Firm* — Carol A. Marmo; Eckert Seamans CHerin & Mellott, LLC

(57) ABSTRACT

The invention includes a cationic cyclopentadienyliron dicarbonyl complex according to the general structure (I):

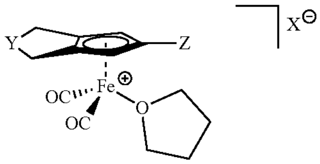

wherein, Y is $(CH_2)_n$ or $(CH_2)_mA(CH_2)_n$, A is O, $NSO_2R$, S, or $CR_1R_2$, each of R, $R_1$ and $R_2$ with respect to A is independently alkyl or aryl, n is an integer from 1 to 8, m+n is an integer from 2 to 7, Z is alkyl, aryl, heteroaryl, or $CF_3$, and X is $BF_4^-$, $ClO_4^-$, $PF_6^-$, $AsF_6^-$, or $SbF_6^-$.

12 Claims, No Drawings

CYCLOPENTADIENYL LIGANDS FOR IRON CATALYSIS

CROSS-REFERENCE TO RELATED APPLICATION

This application claims priority under 35 U.S.C. 119(e) to U.S. Provisional Patent Application Ser. No. 63/397,499, filed Aug. 12, 2022, entitled "CYCLOPENTADIENYL LIGANDS FOR IRON CATALYSIS", which is herein incorporated by reference.

STATEMENT OF GOVERNMENT INTEREST

This invention was made with government support under grant #GM142945 awarded by the National Institutes of Health (NIH). The government has certain rights in the invention.

FIELD OF THE INVENTION

The present invention pertains to a newly developed cationic cyclopentadienyliron dicarbonyl complex enabling the conversion of propylene to its allylic hydroxyalkylated derivatives in a catalytic mode.

BACKGROUND OF THE INVENTION

Propylene gas is produced worldwide by steam cracking on a million-metric-ton scale per year. It serves as a valuable starting material for transformations involving double bonds, but is rarely applied in allylic C—H functionalization through transition metal catalysis.

The production of valuable target molecules from readily available raw materials is a fundamental goal of synthetic chemistry. Transition metal-catalyzed C (sp3)-H bond activation has become an increasingly powerful tactic for expanding the synthetic toolbox by exploiting simple and abundant chemical building blocks. Propylene, one of the smallest hydrocarbons, is the second largest petrochemical feedstock with an annual global production of over 100 million metric tons. Owing to the versatility of the π-bond, propylene is used to produce a number of chemical commodities such as polypropylene, isopropyl alcohol, acrylonitrile and propylene oxide. Given the plentiful supply and synthetic utility, propylene has received growing attention in the realm of modern olefin chemistry, with successful employment in a wide array of transformations including hydrofunctionalization, difunctionalization, cycloaddition, "ene" reaction, metathesis and vinylic functionalization.

Transition metal-catalyzed allylic C—H functionalization has seen remarkable advances for over a decade, considerably extending the utility of simple unfunctionalized olefins. Nevertheless, methodologies employing propylene remain rare in this regard. In one approach, propylene has been used to generate π-allyl metal complexes for the installation of carbon-based nucleophiles. Recently, the development of radical-mediated allylic functionalization has expanded the role of the allylic intermediates, thereby allowing for the coupling of alkenes and π-electrophiles, as well as other amenable partners. The application of this approach to propylene, however, results in low to moderate yields (3% and 49% yield) in comparison to higher alkenes. In addition, there are few examples of apparent metal-catalyzed allylic C—H functionalization of propylene, wherein the C—C π-bond of propylene initially undergoes metal-mediated functionalization, which is then followed by β-hydride elimination from the original allylic carbon of propylene to generate a new C═C bond. Other formal allylic C—H functionalization strategies include pre-functionalization of propylene using the "ene" reaction, deprotonation through strong Bronsted base catalysis, and electrochemical synthesis via dicationic intermediates. Although these efforts have demonstrated the applicability of state-of-the-art methodologies to allylic functionalization of propylene, the scope of this transformation remains relatively limited.

Based on the underdeveloped potential of propylene as a starting material, there is a need in the art to further enrich the diversity of products that propylene can access by devising new strategies, while taking into account the merits of mildness, efficiency and catalyst sustainability.

SUMMARY OF THE INVENTION

In one aspect, the disclosed concept provides a cationic cyclopentadienyliron dicarbonyl complex according to the general structure (I):

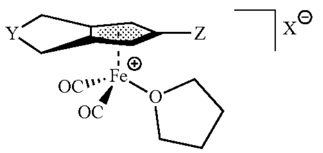

(I)

wherein, Y is $(CH_2)_n$ or $(CH_2)_mA(CH_2)_n$, A is O, $NSO_2R$, S, or $CR_1R_2$, each of R, $R_1$ and $R_2$ with respect to A is independently alkyl or aryl, n is an integer from 1 to 8, m+n is an integer from 2 to 7, Z is alkyl, aryl, heteroaryl, or $CF_3$, and X is $BF_4^-$, $ClO_4^-$, $PF_6^-$, $AsF_6^-$, or $SbF_6^-$.

In certain embodiments, for the complex, R with respect to A is $CH_3$, $p\text{-}C_6H_4CH_3$, or $CF_3$. In certain embodiments, for the complex, each of $R_1$ and $R_2$ with respect to A is independently $CH_3$, $CH_2CH_3$, $CH(CH_3)_2$, $C(CH_3)_3$, or $C_6H_5$. Further, in certain embodiments, Z is $—CH_3$, $—CH_2CH_3$, $—CH(CH_3)_2$, -cyclohexyl, -phenyl, -4-methoxyphenyl, -4-(trifluoromethyl)phenyl), -2-furyl, or -2-thiophenyl. Furthermore, in certain embodiments, Y is $(CH_2)_2$.

In another aspect, the invention provides a cyclopentadienyliron dicarbonyl product of the general structure (III):

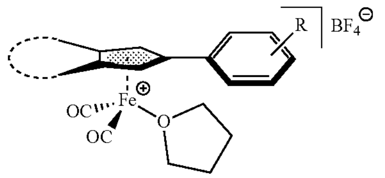

(III)

wherein R in structure III is 4-MeO, 2-Me-4-MeO, 3,5-$Me_2$, 3,5-$Me_2$-4-MeO, or 2,6-$Me_2$.

DETAILED DESCRIPTION

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject invention. It will be evident, however, that the disclosed concept can be practiced without these specific details without departing from the spirit and scope of this innovation.

The disclosed concept includes a cationic cyclopentadienyliron dicarbonyl complex according to the following general structure (I):

(I)

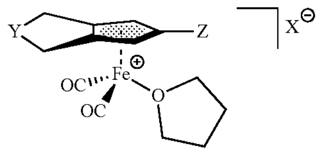

wherein, Y is $(CH_2)_n$ or $(CH_2)_mA(CH_2)_n$, A is O, $NSO_2R$, S, or $CR_1R_2$, each of R, $R_1$ and $R_2$ in structure I is independently alkyl or aryl, n is an integer from 1 to 8, mtn is an integer from 2 to 7, Z is alkyl, aryl, heteroaryl, or $CF_3$, and X is $BF_4^-$, $ClO_4^-$, $PF_6^-$, $AsF_6^-$, or $SbF_6^-$. In certain embodiments, R (with respect to A for structure I) is $CH_3$, p-$C_6H_4CH_3$, or $CF_3$. In certain embodiments, each of $R_1$ and $R_2$ (with respect to A for structure I) is independently $CH_3$, $CH_2CH_3$, $CH(CH_3)_2$, $C(CH_3)_3$, or $C_6H_5$. In certain embodiments, Z is —$CH_3$, —$CH_2CH_3$, —$CH(CH_3)_2$, -cyclohexyl, -phenyl, -4-methoxyphenyl, -4-(trifluoromethyl)phenyl), -2-furyl, or -2-thiophenyl. In certain embodiments, Y is $(CH_2)_2$.

In addition, the disclosed concept includes a cyclopentadienyliron dicarbonyl product of the general structure (III):

(III)

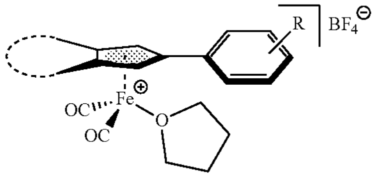

wherein R in structure III is 4-MeO, 2-Me-4-MeO, 3,5-$Me_2$, 3,5-$Me_2$-4-MeO, or 2,6-$Me_2$.

The disclosed concept includes the synthesis of a new family of cyclopentadienyl ligands for iron. In general, the cyclopentadienyl (Cp) ligand is a monoanionic ligand with the formula $C_5H_5$. The first characterized example of a Cp ligand was ferrocene, $Cp_2Fe$, which has an iron atom "sandwiched" between two planar Cp rings. The family of ligands according to the disclosed concept has improved catalytic properties, e.g., higher yields at lower catalyst loading, for the C—H functionalization of terminal alkenes, including the petroleum feedstock propene, for the synthesis of homoallylic alcohols and related products from inexpensive starting materials.

The disclosed concept provides the newly developed cationic cyclopentadienyliron dicarbonyl complex that enables the conversion of propylene to its allylic C—C bond coupling products under catalytic conditions, e.g., hydroxyalkylated derivatives in a catalytic mode. This protocol provides a new deprotonation strategy for allylic C—H activation chemistry with good functional group tolerance. Furthermore, the new family of ligands features a cyclooctano fusion on a cyclopentadienyl ring, as well as an electron-rich aryl ring at the 4-position of the ring. This new family of ligands provides catalysts with higher activity than known in the art. In addition, a range of simple terminal olefins are well employed in this catalyst system with distinctive regioselectivity.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The disclosed concept includes a strategy for α-C—H functionalization of π-bonds using $Fp^X$-based complexes of type $Cp^XFe(CO)_2$ as the catalysts, where $Cp^X$ is a substituted cyclopentadienyl ligand; henceforth, $Fp^x$=$Cp^xFe(CO)_2$. The initial metal π-coordination drastically enhances the acidity of α-C—H bonds to the π-bond, allowing for subsequent deprotonation using weak, hindered amine bases. Then electrophilic attack of the resulting $\eta^1$-iron species with $S_E2'$ selectivity gives the products of net α-C—H functionalization. This catalytic mode is successfully applied to propargylic and allenylic C—H functionalization, delivering a diverse range of C—C bond coupling products. By contrast, unfunctionalized alkenes exhibit inferior reactivities wherein the standard catalyst $[Fp^*(thf)]^+BF_4^-$($Fp^*$=$(C_5Me_5)Fe(CO)_2$) is employed. As a complement to the existing allylic functionalization, the disclosed concept 1) employs the most earth-abundant transition metal as catalyst; 2) circumvents the need for stoichiometric alloy metal reagents; and 3) avoids double bond isomerization during the course of the reaction and delivers products with well-defined regiochemistry.

Based on the aforementioned reasoning, the iron-catalyzed allylation process has been optimized. The inherent lower acidity of allylic C—H bonds ($pK_a$~43) than that of propargyl C—H bonds ($pK_a$~35 to 40) contributes to the difficulty of olefin functionalization; this is addressed by altering the substituents on the cyclopentadienyl ligand to modify the electronic environment of the alkene-iron π-complex, and thus accelerate the deprotonation step, which is the turnover-limiting step in the catalytic system. In addition, the tunable ring substituents are used to modulate stereoselectivity through catalyst-controlled non-covalent interactions in the carbonyl addition transition states.

Taken together, propylene as a high-utility substrate is merged with the development of iron catalysts. There is a mild nucleophilic addition of allylic C(sp3)-H bond of propylene to carbonyl electrophiles. A new class of cyclopentadienyl ligands for iron catalysts equipped with a fused cyclooctane ring and electron-rich arene substituents have been discovered to enable this transformation. This method is successfully applied to allylic functionalization of simple higher olefins.

In certain embodiments, the following synthetic route is conducted.

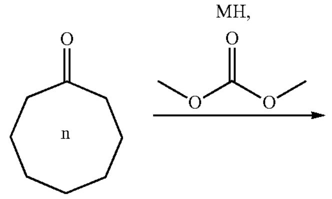

(same route when n = 6, 7)

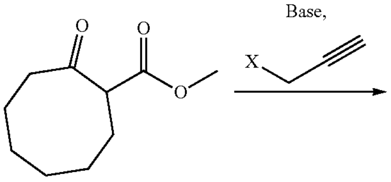

S1

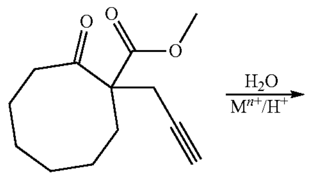

S2

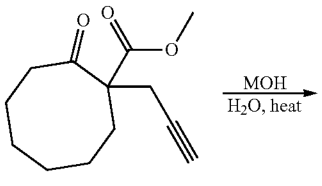

S3

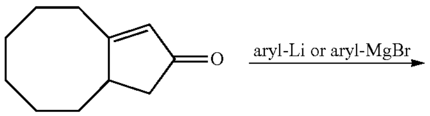

S4

-continued

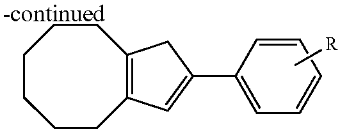

L

The route includes adding to a solution of cyclic ketone starting material, in a polar aprotic solvent, metal hydride (e.g., NaH or KH) and dialkyl carbonate under nitrogen. Suitable polar aprotic solvents include those known in the art, such as, but not limited to THF, 2-methyltetrahydrofuran, dimethylformamide, DMSO, and the like. Suitable metal hydrides include those known in the art, such as, but not limited to dimethyl carbonate, diethyl carbonate, and the like. The resulting mixture is stirred at reflux for a period of time, such as, about 6 hours. The mixture is then cooled to room temperature, quenched, e.g., with 1 N HCl solution at 0° C., and extracted with organic solvent. The combined organic layers are dried, e.g., over magnesium sulfate, and the solvent is removed, such as, by rotary evaporation. The crude product S1 is used in the next step of the process, without purification.

Propargyl halide or pseudohalide is added to the solution of compound S1 obtained in the previous step, and an alkali metal carbonate or phosphate base at room temperature. The propargyl halide or pseudohalide is selected from those known in the art including but not limited to propargyl chloride, propargyl bromide, tosylate, mesylate, and the like. The alkali metal carbonate or phosphate base is selected from those known in the art including but not limited to $Cs_2CO_3$, $K_2CO_3$, $K_3PO_4$, and the like. The reaction mixture is stirred, e.g., overnight. Solid material is then removed by a method, such as, vacuum filtration, and the filtrate is concentrated under reduced pressure; the crude residue is purified, e.g., by column chromatography, to obtain compound S2.

Compound S2 is treated with water in the presence of a transition metal based metal salt or Bronsted acid under heating. Suitable transition metal based metal salts include those known in the art, such as, but not limited to $PdCl_2$, $Hg(OAc)_2$, $FeCl_3$, $Cu(OTf)_2$, and the like. Suitable Bronsted acids include those known in the art, such as, but not limited to TsOH, $HBF_4 \cdot Et_2O$, and the like. After the reaction is complete, the mixture is allowed to cool to room temperature. The crude residue is then purified by column chromatography to provide compound S3.

Compound S3 in an aqueous solution of metal hydroxide is then heated at reflux for a period of time, e.g., about two 2 hours. The metal hydroxide is selected from those known in the art including but not limited to NaOH or KOH. After cooling to room temperature, the mixture is acidified, such as, with diluted $H_2SO_4$ solution, and the product solution is extracted with ether, e.g., diethyl ether. The collected organic fractions are dried, e.g., over magnesium sulfate, and the solvent is evaporated under reduced pressure. Compound S4 is then purified by column chromatography.

Compound S4 is treated with aryl lithium or aryl Grignard reagent at low temperature. After stirring overnight at room temperature, the mixture is quenched with aqueous HCl solution, and extracted with organic solvent. The combined organic layers are dried, e.g., over magnesium sulfate, and concentrated under reduced pressure. Purification by column chromatography provides ligands L as a mixture of cyclopentadiene isomers, which are used in the next step without further purification.

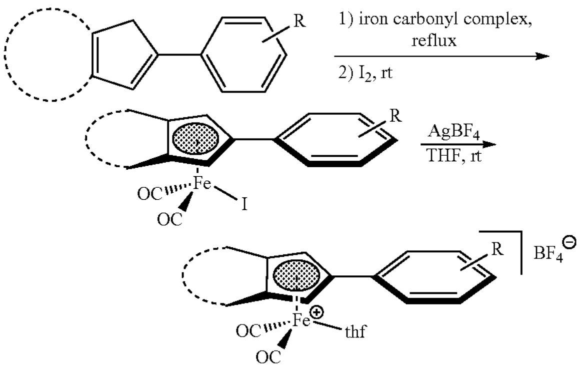

A solution of ligand and an iron carbonyl in a hydrocarbon solvent is heated at reflux under nitrogen for a period of time, e.g., 20 hours. The iron carbonyl is selected from those known in the art, including $Fe(CO)_5$, $Fe_2(CO)_9$, $Fe_3(CO)_{12}$, and the like. The hydrocarbon solvent is selected from those known in the art, including p-xylene, toluene, mesitylene, and the like. The mixture is then cooled to room temperature, and the solvent removed, e.g., by rotary evaporation. The residue is treated with iodine and stirred at room temperature for a period of time, at least 2 hours. Then the mixture is filtered, e.g., through a pad of celite, to remove insoluble solid material. The filtrate is washed, e.g., with saturated $Na_2SO_3$ or $Na_2S_2O_4$ solution. The organic layers are dried, e.g., over magnesium sulfate, and concentrated in vacuo. Column chromatography on silica gel or recrystallization provides the iron-iodide complex.

A flame-dried flask as then charged with iron-iodide complex, such as, $AgBF_4$ and anhydrous material, such as, THF, under nitrogen. The reaction mixture is stirred at room temperature for a period of time, e.g., at least 6 hours. After completion, the solvent is removed, e.g., by rotary evaporation. The residue is dissolved, e.g., in dry $CH_2Cl_2$, and filtered, e.g., through the pad of celite, to remove silver iodide. The catalysts are obtained with the following two methods depending on the feasibility of recrystallization.

Method A: The filtrate is concentrated until little amount of $CH_2Cl_2$ remains, then dry diethyl ether is added until large amounts of crystalline material are precipitated. The crystals are collected by vacuum filtration, washed with dry diethyl ether, and dried in vacuo, for a time period, e.g., about 10 minutes.

Method B: The solvent of the filtrate is removed under reduced pressure. Dry diethyl ether is added to wash the residue, and is decanted. This step is repeated, e.g., five times. The residual solvent is removed in vacuo for a period of time, e.g. 30 minutes. In certain embodiments, work-up and purification, before drying under vacuum, should be carried out as quickly as possible, preferably within 15 minutes.

In certain embodiments, the following aldehyde addition is conducted.

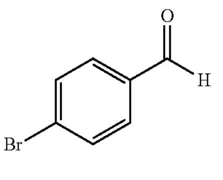

+

-continued

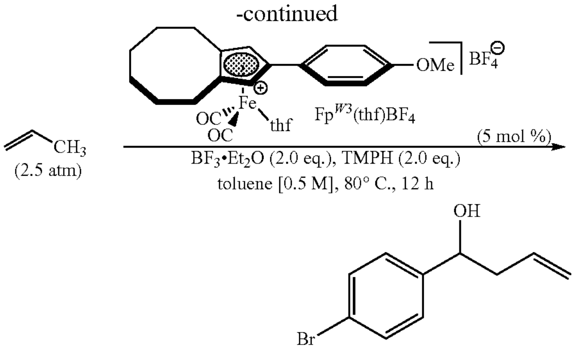

To an oven-dried flask, charged with a magnetic stir bar, are added $Fp^{W3}$(thf)$BF_4$, 4-bromobenzaldehyde, dry toluene, $BF_3$·$Et_2O$, TMPH in succession in an argon-filled glovebox. The flask is sealed with and cooled, e.g., in liquid nitrogen. The reaction mixture is frozen, and then the flask is placed under vacuum for a period of time, e.g., 10 minutes. Then propylene gas is condensed into the flask, such as, through a side arm from a syringe. The liquid nitrogen is removed and the flask resealed. After warming up to room temperature, the flask is heated, e.g., to about 80° C., for a time period, e.g., 12 hours, with vigorous stirring. The crude mixture is concentrated in vacuo and purified by flash column chromatography on silica gel to obtain the desired product. In certain embodiments, the yield is 76% or greater.

EXAMPLES

Example 1—Reaction Development

Under standard conditions, $[Fp^*(thf)]^+BF_4^-$ (10 mol %) was used as the catalyst to enable the coupling of alkenes with commercially available aldehydes. The study was initiated by using 1-naphthaldehyde as the model substrate and one atmospheric pressure of propylene with the aid of a balloon according to Scheme 1a as illustrated below in TABLE 1. A minimal amount of product was afforded. Then elevated pressure of propylene was exerted over the reaction mixture using a pressure tube (approx. 8 atm initial pressure, 1.1 mmol of propylene), which resulted in a notable improvement of yield (though still modest) according to Scheme 1b as illustrated below in TABLE 1. The yields were determined by $^1H$ NMR using 2,4-dinitrotoluene as the internal standard. These preliminary results provided evidence for the possibility of propylene functionalization. Thus, an exploration of iron catalysts was performed.

It was hypothesized that increasing the π-acidity of the cationic iron complex would improve catalyst efficiency by facilitating the deprotonation of the iron-alkene complex. Bearing fewer electron-donating alkyl substituents than Cp* and being readily prepared and modifiable, 2-phenyltetrahydroindenyl ($Cp^{W1}$) was considered as a ligand, and $Fp^{W1}$(thf)$BF_4$ was prepared and evaluated as a catalyst (henceforth, $Fp^X$(thf)$BF_4$ represents $[Fp^X(thf)]^+BF_4^-$) (Scheme 1b). To implement the strategy of enhancing the acidity of alkene-iron complexes, the electronegativity of the Cp (cyclopentadiene) ring on the iron was increased. $Fp^{W1}$(thf)$BF_4$ catalyst was formed by removing two methyl substituents from Cp* (pentamethylcyclopentadiene) and introducing a fused cyclohexane ring and a phenyl group according to Scheme 1b as illustrated in TABLE 1 below. This novel catalyst led to higher yield than $Fp^*$(thf)$BF_4$. Comparison of the IR stretching frequencies of the CO ligands (v (CO)) supported $Cp^{W1}$ being less electron donating. Motivated by the importance of ligand steric effects in previously developed iron catalysts for allene and alkyne functionalization, the effect of modifying the fused cyclohexane ring in $Cp^{W1}$ was examined. Indeed, $Fp^{W2}(thf)BF_4$ bearing a fused cyclooctane ring exhibited still higher efficiency for propylene functionalization. A significantly higher v (CO) of this complex was also observed, indicating that there may also be a substantial electronic effect from changing the ring size. Fine tuning of the aryl substituents on the cyclopentadienyl ring led to the identification of 4-methoxyphenyl substituted $Fp^{W3}(thf)BF_4$ as an effective and generally applicable catalyst for the coupling of propylene with aryl aldehydes. The optimized conditions were further refined by additional adjustments of reagent stoichiometries.

With the core structure remaining, the ring effect was observed by replacing cyclohexane with cyclooctane, providing a substantial increase in the yield. To rationalize this observation, it was conjectured that the enlargement of the fused ring facilitated the dissociation of alkene-iron complexes, therefore giving a faster ligand exchange to release the coupling product. The comparison among a series of derivatives based on the electronic properties of the phenyl ring ($Fp^{W3}(thf)BF_4$ to $Fp^{W6}(thf)BF_4$) led to $Fp^{W3}(thf)BF_4$ as the optimal catalyst, indicating a pivotal effect of electron-rich arene substituents on catalyst reactivity.

TABLE 1

Scheme 1 (a, b and c)

a.

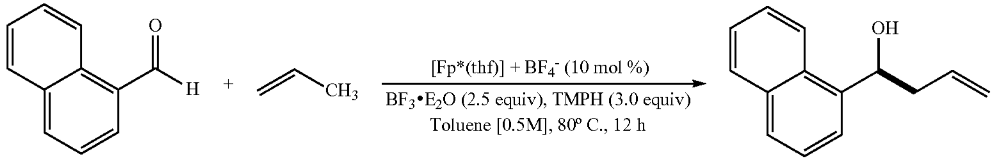

1 (0.1 mmol)

1a

| Initial pressure of propylene | Yield (%) |
| --- | --- |
| 1 atm (balloon) | 4 |
| 8 atm (1.1 mmol) | 38 |

b.

Reaction conditions:
Aldehyde 1. Iron catalyst 10 mol %
Initial propylene pressure 8 atm
$BF_3$•$E_2O$ (2.5 equiv), TMPH (3.0 equiv)
Toluene [0.5 M], 80° C., 12 h

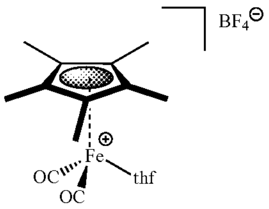

Fp*(thf)$BF_4$
v(CO) = 2040, 1989 $cm^-$
38% yield

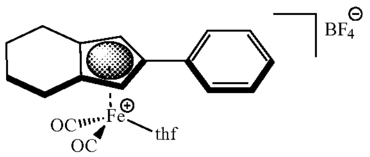

$Fp^{W1}$(thf)$BF_4$
v(CO) = 2043, 1992 $cm^{-1}$
47% yield

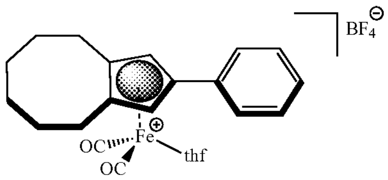

$Fp^{W2}$(thf)$BF_4$
v(CO) = 2053, 2008 $cm^{-1}$
66% yield

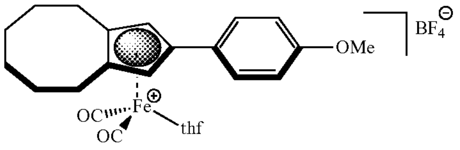

$Fp^{W3}$(thf)$BF_4$
v(CO) = 2045, 1995 $cm^{-1}$
84% yield

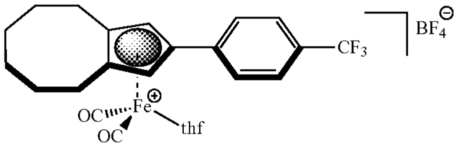

$Fp^{W4}$(thf)$BF_4$
v(CO) = 2053, 2007 $cm^{-1}$
52% yield

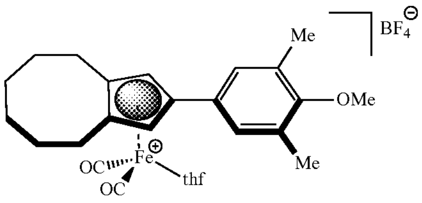

$Fp^{W5}$(thf)$BF_4$
v(CO) = 2045, 1994 $cm^{-1}$
70% yield

TABLE 1-continued
Scheme 1 (a, b and c)
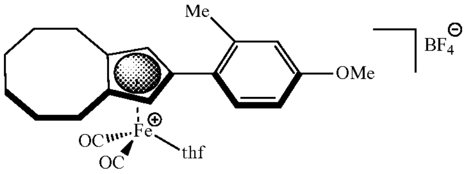
$Fp^{W6}(thf)BF_4$
$\nu(CO) = 2046, 1995\ cm^{-1}$
83% yield
c.
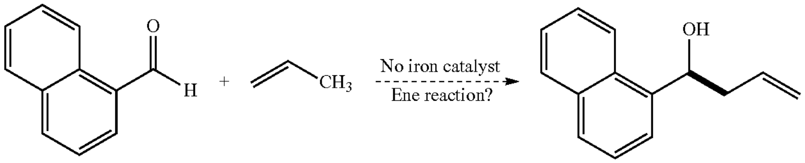
1 1a
| Lewis Acids | Yield (%) |
|---|---|
| $BF_3 \cdot E_2O$ | 0 |
| $AlCl_3$ | 0 |

The optimized conditions were finalized by additional adjustment of acid and base stoichiometries. Given the presence of Lewis acid, it was investigated whether the product could be generated through the "ene" reaction pathway, since the occurrence of double bond isomerization is ambiguous in this case. A simple and straightforward experiment for this testing was performed according to Scheme 1c as illustrated in TABLE 1 above. The reaction in the absence of iron catalyst and base at ambient temperature resulted in no detectable product. The same was observed when applying aluminum chloride instead of boron trifluoride, a commonly used Lewis acid for the "ene" reactions. Thus, the role of iron catalyst was revealed to be indispensable in the process of allylic functionalization of propylene.

With respect to TABLE 1, in Scheme 1a, initial results were obtained by using $[Fp^*(thf)]^+BF_4^-$ as the catalyst and yields were determined by $^1H$ NMR using 2,4-dinitrotoluene as the internal standard; in Scheme 2b, examination of iron catalysts on the reaction in Scheme 2a was conducted and yields were determined by 1H NMR using 2,4-dinitrtoluene as the internal standard (0.1 mmol scale); in Scheme 2c, the possibility of "ene" reaction was tested; conditions included 0.1 mmol of 1-naphthaldehyde, propylene (8 atm), Lewis acid (2.0 eq.), DCM (0.5 mL), rt, of 24 hours.

Substrate Scope

With the effective iron catalysts provided, the scope of a variety of aldehydes was evaluated to obtain the desired homoallylic alcohols, which are valuable building blocks. Below, TABLE 2, structures 1a through 10a, illustrates the aryl aldehydes with different substitution patterns ranging from highly electron-poor to mildly electron-rich that were all successfully accommodated in the catalytic system. Among structures 1a through 10a, particular functional groups including an internal alkyne (3a), a methyl sulfone (7a), an aryl tosylate (8a), and a sulfonamide (9a) were well tolerated. Moreover, a range of nitrogen-, oxygen- and sulfur-containing heteroaryl aldehydes were examined as shown in TABLE 2. The substrates bearing electron withdrawing groups adjacent to heteroatoms performed the allylation process in good yields (11a, 15a-16a, 18a-19a). A coumarin-type aldehyde featuring lactone motif was also found to be a suitable coupling partner (13a). Electron-rich heteroaryl aldehydes (12a, 14a, 17a) reacted smoothly, albeit with diminished yields.

TABLE 2
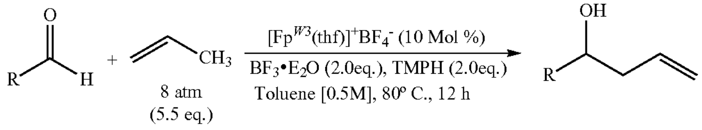
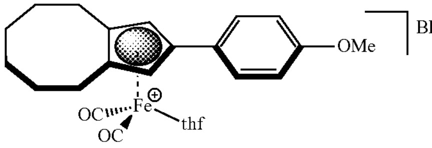
Fp$^{W3}$(thf)BF$_4$
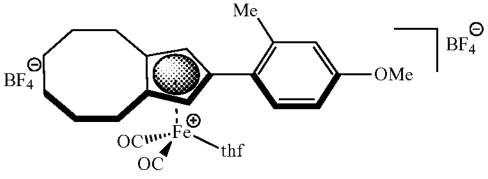
Fp $^{W6}$(thf)BF$_4$
Aryl adehydes
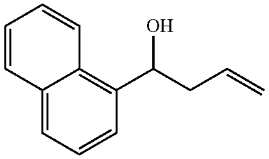
1a, 83% Yield
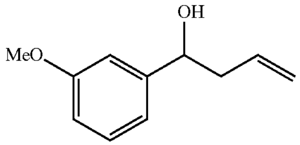
2a, 82% Yield[b]
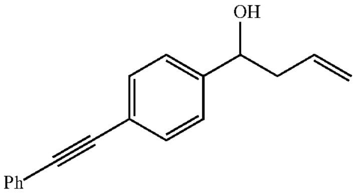
3a, 87% Yield
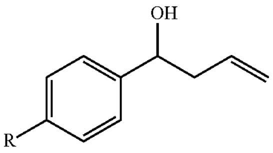
4a, R = H, 77% Yield
5a, R = Br, 84% Yield[b]
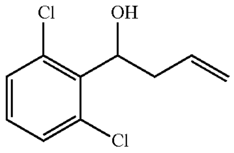
6a, 91% Yield[b]
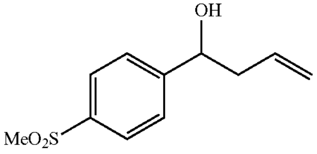
7a, 79% Yield
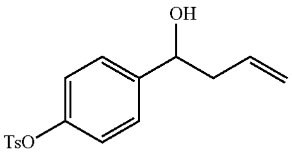
8a, 89% Yield
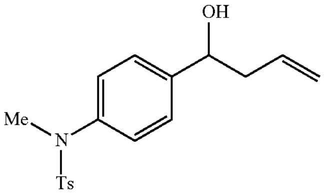
9a, 70% Yield[c]
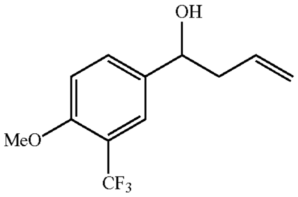
10a, 69% Yield[c]
Fp*: 31% Yield TABLE 2-continued
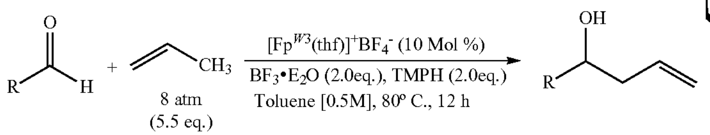
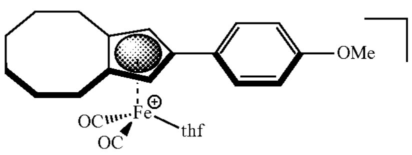
Fp$^{W3}$(thf)BF$_4$
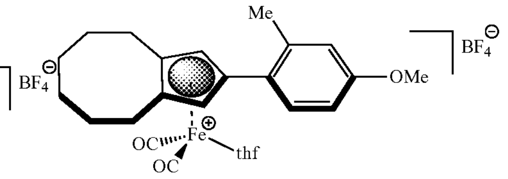
Fp $^{W6}$(thf)BF$_4$
Heteroaryl aldehydes
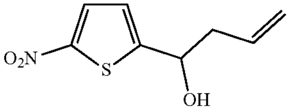
11a, 80% Yield
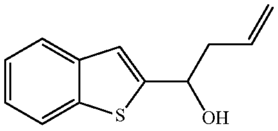
12a, 52% Yield
Fp*; N.P.
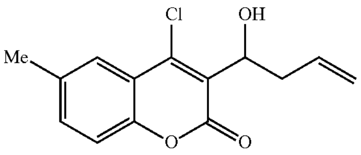
13a, 81%% Yield
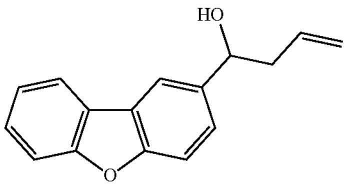
14a, 48% Yield[c]
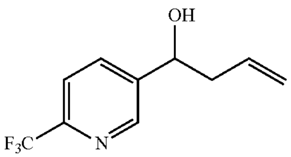
15a, 91% Yield
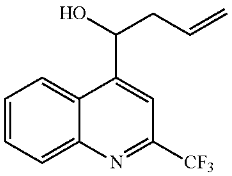
16a, 93% Yield
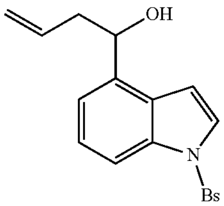
17a, 64% Yield[c]
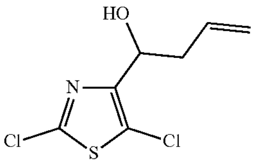
18a, 76% Yield
Fp*: 17% Yield
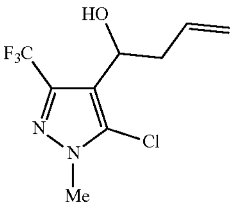
19a, 88% Yield TABLE 2-continued
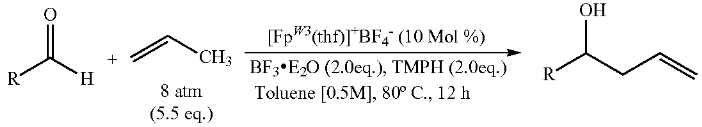
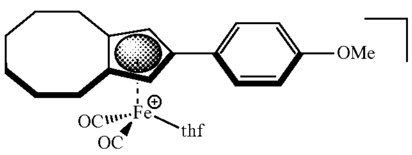
Fp$^{W3}$(thf)BF$_4$
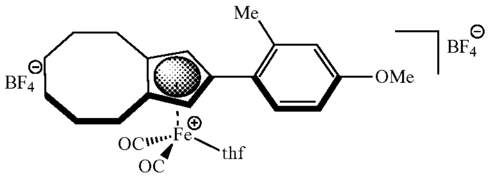
Fp $^{W6}$(thf)BF$_4$
Alkyl aldehydes
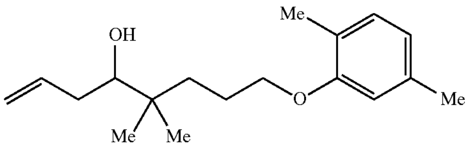
From Gemfibrozil
20a, 78% Yield
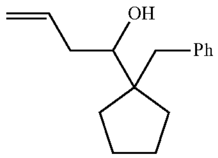
21a, 86% Yield[c]
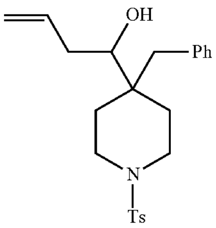
22a, 76% Yield[c]
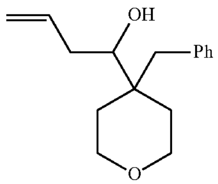
23a, 88% Yield[d]
Dialdehyde
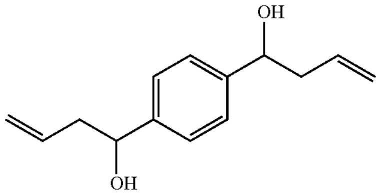
24a, 52% Yield[e]

TABLE 2-continued
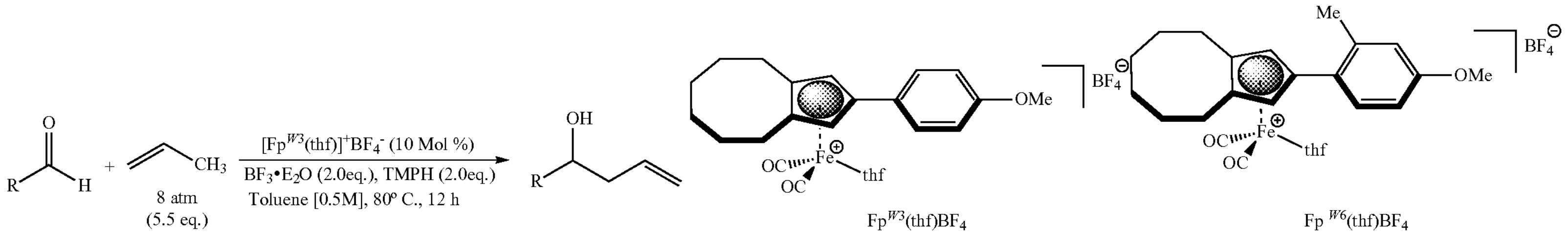
Fp$^{W3}$(thf)$BF_4$ Fp $^{W6}$(thf)$BF_4$
Natural skeleton and drug motifs
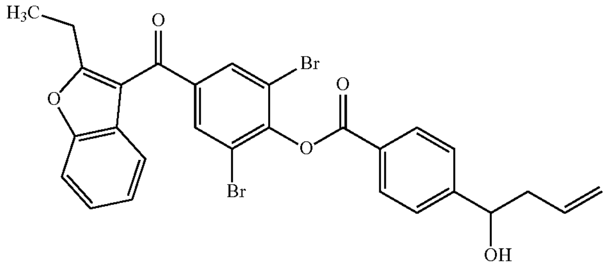
From Benzbromarone
27a, 40% Yield[f]
Fp*: 6% Yield
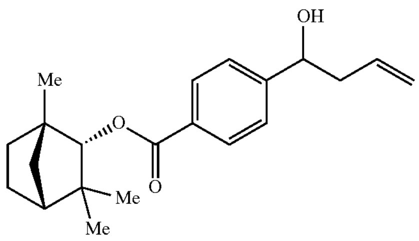
From Fenchyl Alcohol
25a, 90% Yield[b]
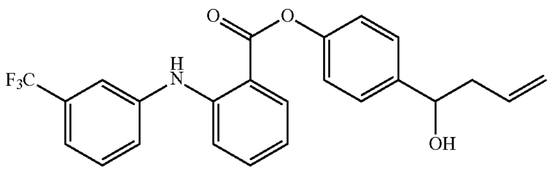
From Flufenamic Acid
28a, 37% Yield[f]
Fp*: 7% Yield
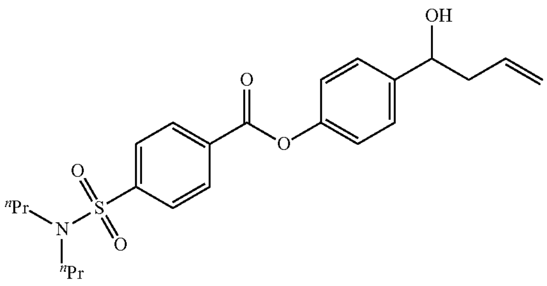
From Probenecid
26a, 74% Yield[c]

TABLE 2-continued
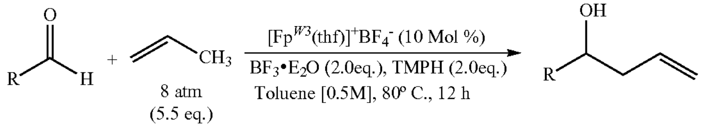
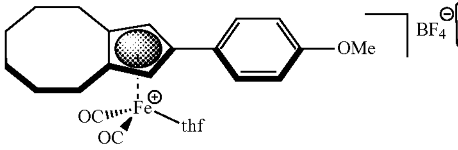
Fp$^{W3}$(thf)BF$_4$
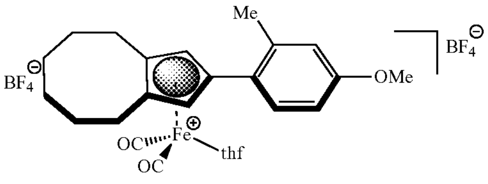
Fp $^{W6}$(thf)BF$_4$
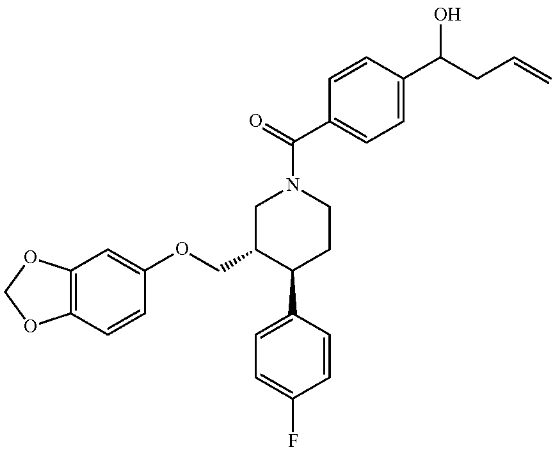
From Paroxetine
29a, 59% Yield[c]

Several sterically hindered alkyl aldehydes illustrated in TABLE 2 were subjected to the standard conditions: aldehyde (0.2 mmol), propylene (8 atm, 5.5 eq.), $Fp^{W3}(thf)^+BF_4^-$ (10 mol %), $BF_3{\cdot}Et_2O$ (2.0 eq.), TMPH (2.0 eq.), toluene (0.4 mL), 80° C., 12 h. [b]5 mol % $Fp^{W3}(thf)^+BF_4^-$. [c]TMPH (3.0 eq.), $Zn(NTf_2)_2$ (10 mol %) was added. [d]$BF_3{\cdot}Et_2O$ (3.0 eq.), TMPH (3.0 eq.). [e]0.1 mmol scale, $Fp^{W3}(thf)^+BF_4^-$ (20 mol %), $BF_3{\cdot}Et_2O$ (4.0 eq.), TMPH (6.0 eq.), $Zn(NTf_2)_2$ (20 mol %), toluene (0.2 mL). [f]10 mol % $Fp^{W6}(thf)^{+BF}{}_4^-$. An acyclic aldehyde derived from gemfibrozil (20a) and an aldehyde bearing a cyclic alkyl group (21a) reacted efficiently in good yields. Piperidine-substituted aldehyde (22a) was also a suitable substrate for this reaction. Pyran-substituted aldehyde (23a) was tolerated well with higher acid and base stoichiometries. In particular, 1,4-benzenedicarbaldehyde underwent diallylation in moderate yield (24a) when double amounts of catalyst and reagents were employed.

In addition, the applicability of the inventive concept was explored by examining substrates incorporated with complex scaffolds of pharmaceutical importance, as illustrated in TABLE 2 (i.e., 25a-29a). Aldehydes carrying fenchol (25a), probenecid (26a), benzbromarone (27a) and paroxetine (29a) were found to be effective substrates with moderate to good yields. Remarkably, a flufenamic acid-derived aldehyde bearing a potentially sensitive amino group (28a) reacted cleanly in our system. During the course of the scope examination, we found that the catalyst loading could be reduced to 5 mol % for highly reactive aldehydes, while the addition of $Zn(NTf_2)_2$ was needed to improve the yield for aldehydes with low reactivity. In a few cases (27a, 28a), the catalyst was switched to $Fp^{W6}(thf)BF_4$ to obtain the corresponding homoallylic alcohols productively.

Further investigated was the extension of the iron-catalyzed propylene functionalization reaction to other types of electrophiles TABLE 3 below. A pair of N-benzylated isatins were selected as coupling partners, which delivered C-3 carbonyl allylation products in good to excellent yields (30a, 31a). Also subjected to the standard conditions were N, O-acetal reagents; propylene reacted efficiently with the in situ generated iminium to deliver the desired homoallylic amines (32a-34a). The use of the diethyl acetals of aryl aldehydes as substrates was also feasible, delivering benzylic ethyl ethers 35a and 36a in modest to moderate yields. The standard conditions were aldehyde (0.2 mmol), propylene (8 atm, 5.5 eq.), FpW3(thf)+BF4− (10 mol %), BF3·Et2O (2.0 eq.), TMPH (2.0 eq.), DCE (0.4 mL), 80° C., 12 h. btoluene (0.4 mL), 100° C.

TABLE 3

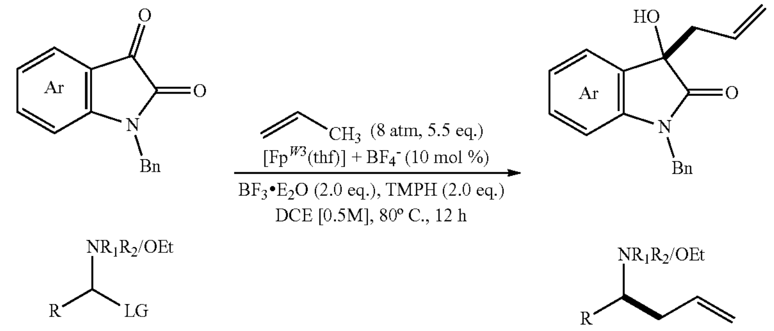

Isatins

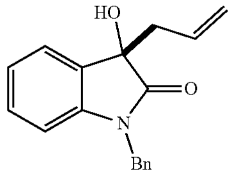

30a,
95% yield

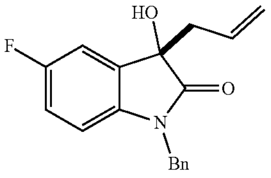

31a,
72% yield

N,O-acetals

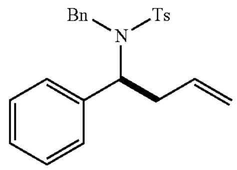

32a, 93% yield
Fp*: 56% yield
($R_1$ = Bn, $R_2$ = Ts,
LG = OBn)

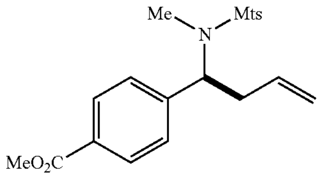

33a, 86% yield
($R_1$ = Me, $R_2$ = Mts,
LG = OMe)

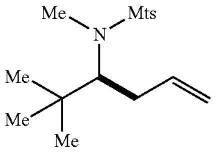

34a, 92% yield
($R_1$ = Me, $R_2$ = Mts,
LG = OMe)

TABLE 3-continued

Acetals (LG = OEt)

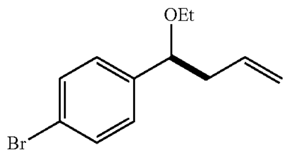

35a, 35% yield[b]

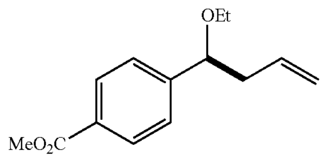

36a, 55% yield[b]

Carbonyl Allylation Reactions with Higher Olefins

After exploring the scope of electrophiles, the inventive methodology was applied to allylic C—H functionalization of higher olefins. A study was conducted by subjecting 4-bromobenzaldehyde and 1-octene to the initial conditions (10 mol % Fp*(thf)$BF_4$) for catalyst development, furnishing the branched-selective hydroxyalkylation product with modest yield and low level of diastereoselectivity control (36% yield, 2.0:1 d.r.). Use of the optimal catalyst $Fp^{W3}$(thf)$BF_4$ discovered in propylene functionalization led to excellent yield and enhanced diastereoselectivity, with even lower catalyst loading and reaction temperature reduced to 5 mol % and 45° C., respectively. An additional improvement of diastereoselectivity was observed by switching the catalyst to $Fp^{W5}$(thf)$BF_4$. Under the modified conditions, several commonly used chlorine-, oxygen- and nitrogen-containing functional groups were tolerated as shown in TABLE 4, as well as a boronic acid pinacol ester (5f) and a thiophene (5h). It was also found that the reaction could undergo selective functionalization of allylic C—H bonds in the presence of a propargyl amine (5i). X-ray crystallographic analysis of compound 5k confirmed the relative configuration of the major diastereomer. Then the reactivities of internal olefins were further examined. Several benzocycloalkenes and cis-β-methylstyrene could be coupled under the same conditions, notwithstanding the low control of diastereoselectivity (5p-5t).

TABLE 4

Scope of Olefins for Allylic C—H Functionalization

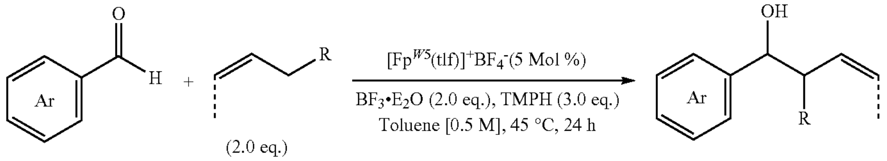

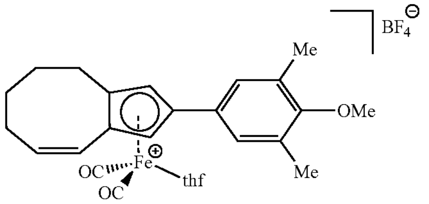

$Fp^{W5}$(thf)$BF_4$

Terminal alkenes

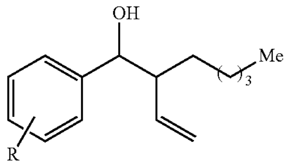

5b R = 4-bromo
93% yield, 4.8:1 d.r.
7b R = 3-methoxy
93% yield, 3.6:1 d.r.
6b R = 4-methoxycarbonyl
94% yield, 4.6:1 d.r.

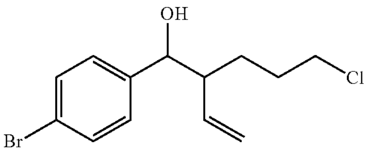

5c, 86% yield
3.7:1 d.r.

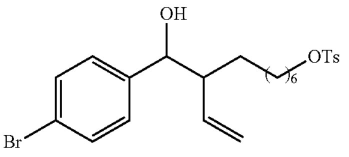

5d, 95% yield
3.4:1 d.r.

TABLE 4-continued
Scope of Olefins for Allylic C—H Functionalization
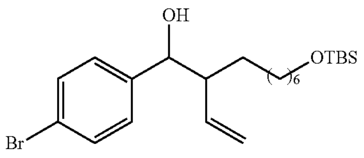
5e, 90% yield
4.3:1 d.r.
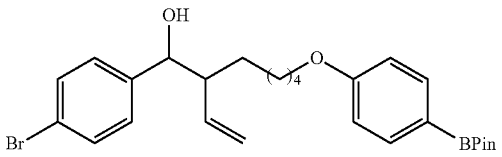
5f, 85% yield
4.0:1 d.r.
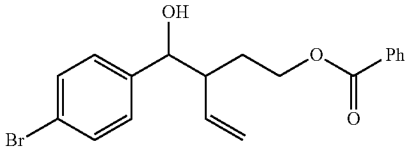
5g, 92% yield
3.4:1 d.r.
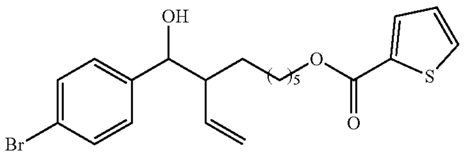
5h, 95% yield
4.3:1 d.r.
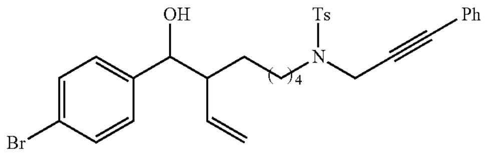
5i, 76% yield[b]
3.5:1 d.r.
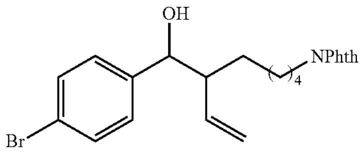
5j, 92% yield
4.6:1 d.r.
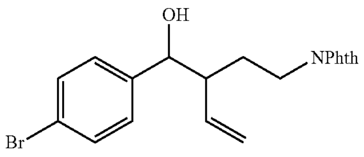
5k, 95% yield
3.9:1 d.r.
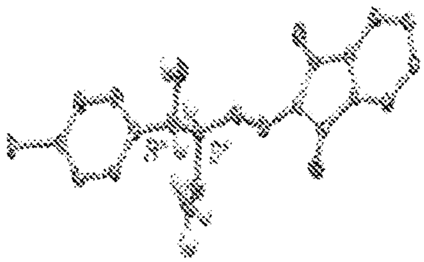
major diastereomer of 5k [X-ray]
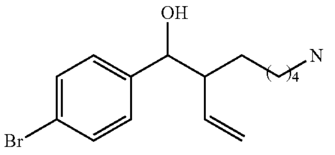
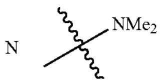
5l, 68% yield[b,c]. 2.6:1 d.r.
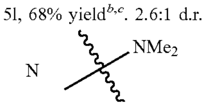
5m, 63% yield[b], 3.7:1 d.r.
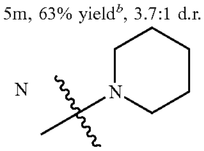
5n,
Fp*
5n, 60% yield[b,c], 2.7:1 d.r.
Fp*: 5% NMR yield, 2.0:1 d.r.
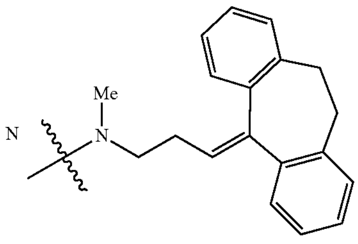
from Nortriptyline
5o, 55% Yield[b,c], 2.8:1 d.r.

TABLE 4-continued

Scope of Olefins for Allylic C—H Functionalization

Internal alkenes

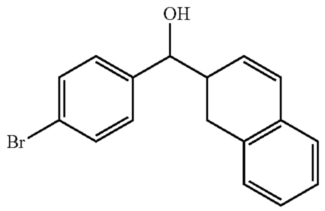

5p, 81% yield, 1.3:1 d.r.
Fp*: 27% yield, 1.2:0 d.r.

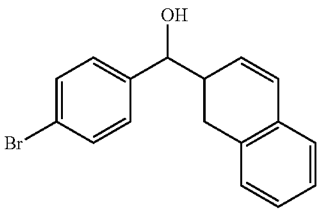

5q, 76% Yield
2.0:1 d.r.

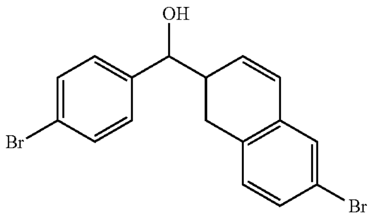

5r, 86% Yield
1.0:1 d.r.

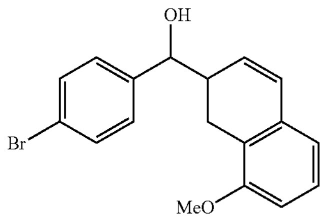

5s, 83% Yield
1.7:1 d.r.

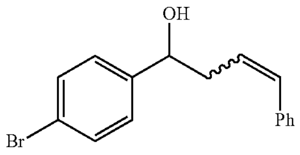

5t, 82% Yield
1.2:2 Z/E

Synthetic Applications

The propylene functionalization process was easily scaled up to 3 mmol under reduced pressure of 2.5 atm. Meanwhile, the allylic functionalization reaction of 1-octene was conducted on a 10 mmol scale to produce multigram quantities of product 5b according to Scheme 3a) as illustrated in TABLE 5. To showcase the versatility of the allylation products, the homoallylic alcohol building blocks were used to construct some common heterocycle motifs. Three of the products (4a, 12a, 15a) were derivatized into molecules containing lactone-(37), tetrahydropyran-(38) and dihydropyrazole (39) moieties through multistep transformations according to Scheme 3b as illustrated in TABLE 5. Moreover, manipulation of the C═C bond was demonstrated by applying modern CuH catalysis, leading to an anti-Markovnikov hydroamination product (40).

TABLE 5

Scheme 3 (a and b) - Synthetic Applications a. Large-scale reactions

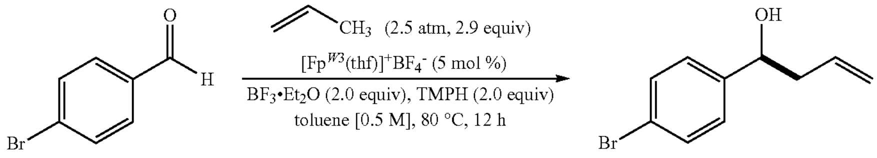

5 (3.0 mmol)

5a, 76% yield

TABLE 5-continued

Scheme 3 (a and b) - Synthetic Applications

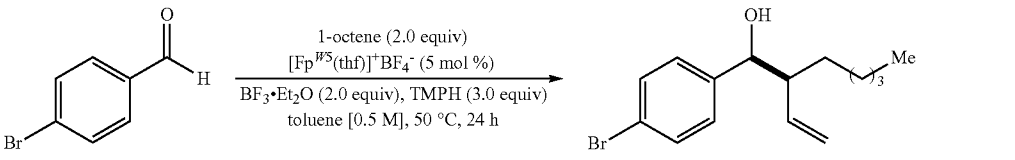

5 (10 mmol)

5b, 2.8 g, 95% yield, 4.1:1 d.r.

b. Divergent transformations of products

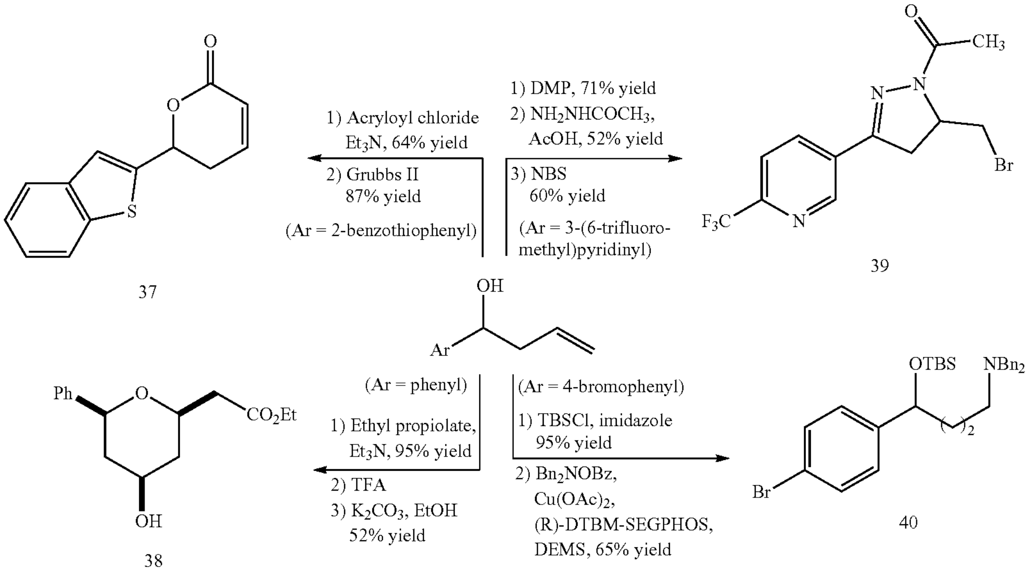

37

39

38

40

Mechanistic Insights on Deprotonation Step

In order to understand the superior reactivity of Fp$^{W3}$(thf) BF$_4$ catalyst as well as the stepwise mechanism, kinetic studies and stoichiometric reactions of the deprotonation step were performed. The investigation was initiated by kinetic isotope effect experiments using 1-decene (u) and its allylic-deuterated isotopologue (u-d$_2$) according to Scheme 4a as illustrated in TABLE 7 below. Reactions conducted in parallel yielded a $k_H/k_D$ of 2.8, while intermolecular competition reaction resulted in the same KIE value of 2.8 according to Scheme 4a. These results indicated a primary kinetic isotope effect. The primary kinetic isotope effect measured in both sets of experiments suggests that proton abstraction is likely the turnover-limiting step.

On that basis, it was presumed that the different performances between catalysts based on Fp$^{W3}$ and Fp* are mainly mainly result from the differences of their abilities to promote the deprotonation step. A series of cationic Fp$^X$-alkene (Fp$^X$=Fp* or Fp$^{W3}$) complexes were prepared by adding the alkene to the solution of Fp$^X$-thf species (Fp$^X$(thf)BF$_4$) for the comparison of their stoichiometric reactivities. Deprotonation reactions were performed by treating these complexes with Et$_3$N in CD$_2$Cl$_2$ for 2 hours, by which time most reactions had reached equilibrium. The equilibrium constants for deprotonation could not be determined due to the formation of side products; however, the NMR yields of the deprotonation products (Scheme 4b) as well as other quantifiable species in each reaction mixture were determined. The deprotonation yields of all FpW3-alkene complexes were significantly higher than those of Fp*-alkene complexes, indicating a more facile cleavage of the allylic C—H bonds enabled by Fp$^{W3}$. During the course of deprotonation of Fp*-alkene complexes, significant amounts of free alkenes especially in the case of 1-hexene were observed suggesting that dissociation of the substrate is a competitive process. In contrast, this behavior was not observed for Fp$^{W3}$-alkene complexes. In summary, from the view of stoichiometric deprotonation step, the new catalyst Fp$^{W3}$(thf)BF$_4$ enhances the reactivity of the iron-alkene species and inhibits the tendency of alkene dissociation.

TABLE 6
Scheme 4 (a, b and c)
A. Kinetic isotope effect
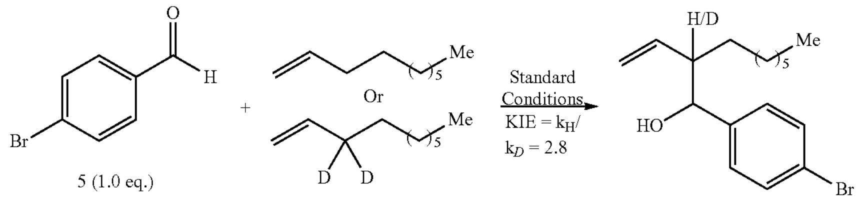
5 (1.0 eq.)
(0.97 D)
u or u-$d_2$ (2.0 eq.)
5u or 5u-$d_1$
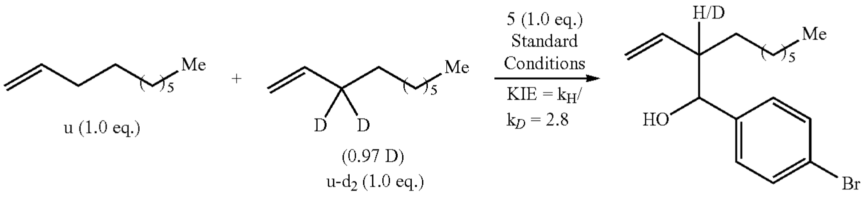
u (1.0 eq.)
(0.97 D)
u-$d_2$ (1.0 eq.)
5u or 5u-$d_1$
b. Stoichiometric studies on deprotonation step
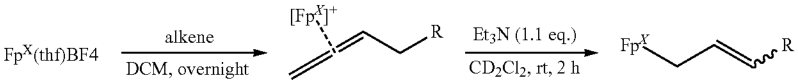
Int-I
Int-II
| Fp$^x$-based Complex | 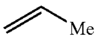 | 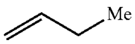 | 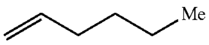 |
|---|---|---|---|
| 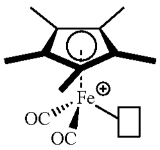 (Fp*) | N.P. | 32% yield free slene 7% | 26% yield free alkene 33% |
| 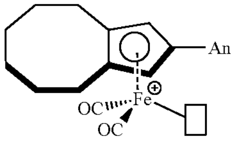 (Fp$^{W3}$) | 28% yield | 66% yield | 58% yield |

TABLE 6-continued

Scheme 4 (a, b and c)

c. Additional stoichiometric experiments

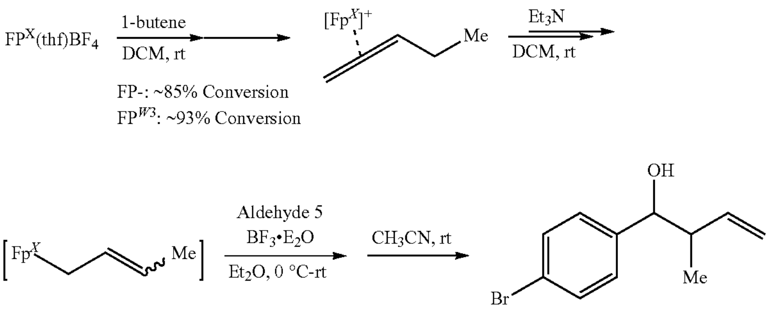

5v

Overall Yields
Fp*: 11% NMR yield,
6.8:1 d.r.
$Fp^{W3}$: 57% NMR yield,
4.8:1 d.r.

Streamlined Stoichiometric Experiments

To provide additional evidence for the catalytic cycle, the electrophilic functionalization reactions of Fp* and $Fp^{W3}$-based allyliron species II-v were conducted. Although compound II-v could not be purified, the desired allylic functionalization product 5v (Scheme 4c) was obtained by treating the cationic complexes I-v with $Et_3N$ for 2 hours to effect deprotonation, and subsequently subjecting the crude mixture to the solution of 4-bromobenzaldehyde (5) and $BF_3$. $Et_{20}$ as shown in TABLE 6 above. Thereafter, each of the elementary steps of the catalytic system were performed in streamline with the two catalysts (Fp*(thf)$BF_4$ and $Fp^{W3}$ (thf)$BF_4$) and their overall yields were compared. Consistent with catalytic results, the $Fp^{W3}$-based complex delivered a significantly higher yield of the coupling product 5v compared to the Fp*-based complex. The formation of equal amounts of E and Z isomers of allylic iron species after deprotonation (1.5:1 Z/E, Scheme 4b) were observed, which should result in different diastereomers after coupling with the electrophile. Interestingly, a relatively high level of diastereoselectivity was achieved (4.8:1 d.r.) in the stoichiometric electrophilic functionalization step, which indicates that one of the isomers was functionalized in preference to the other.

Example 2—Synthetic Route

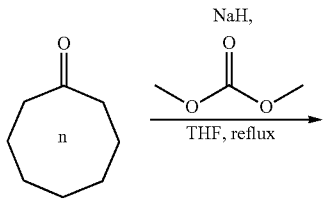

(same route when n = 6, 7)

-continued

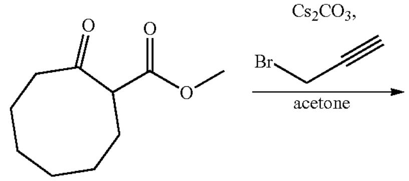

S1

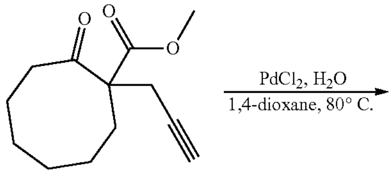

S2

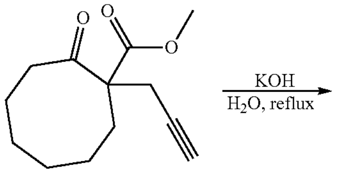

S3

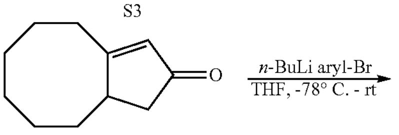

S4

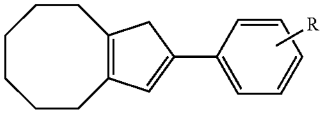

L

A 500 mL three-necked round bottom flask was fitted with a reflux condenser and a 125 mL pressure-equalizing dropping funnel containing cyclooctanone (12.6 g, 100 mmol, 1.0 equiv) and 100 mL of anhydrous THF. The reaction vessel was charged with NaH (8.00 g, 200 mmol, 2.0 equiv, 60% oil dispersion), dimethyl carbonate (17 mL, 200 mmol, 2.0 equiv) and 100 mL of dry THF under a flow of nitrogen. The flask was placed in an oil bath preheated at 76° C. The ketone solution was added slowly to the flask at reflux with stirring. After the addition was completed, the reaction mixture was heated at reflux for 6 h. Then the mixture was cooled to room temperature, quenched by adding 1 N HCl solution dropwise at 0° C. until no bubbles were formed, and extracted with EtOAc (2× 200 mL). The combined organic layers were dried over magnesium sulfate and the solvent was removed by rotary evaporation. The crude product S1 was used in the next step without purification.

Propargyl bromide (17 mL, 200 mmol, 2.0 equiv) was added to the solution of compound S1 obtained in the last step and $Cs_2CO_3$ (47.9 g, 150 mmol, 1.5 equiv) in 250 mL of acetone, previously dried over magnesium sulfate for 2 h. The reaction mixture was stirred at room temperature overnight. Solid material was removed by vacuum filtration, and the filtrate was concentrated under reduced pressure. The crude residue was purified by column chromatography (gradient elution from 50:1 to 10:1 hexanes/EtOAc) to obtain compound S2 as a pale yellow liquid (22.2 g, 100% yield).

A 500 mL round bottom flask was charged with $PdCl_2$ (355 mg, 2.0 mmol, 2 mol %), compound S2 (22.2 g, 100 mmol, 1.0 equiv), water (5 mL, 50 mg/mmol) and 250 mL of 1,4-dioxane under a flow of nitrogen. The reaction mixture was heated at 80° C. for 3 h. After the reaction was complete, the flask was allowed to cool to room temperature. The crude residue was purified by column chromatography (gradient elution from 50:1 to 3:1) to afford compound S3 as a yellow oil (24.0 g, 100% yield).

Compound S3 (50 mmol) and 300 mL of 10% aqueous solution of potassium hydroxide were heated at 120° C. at reflux for 2 h. After cooling to room temperature, the mixture was acidified with diluted $H_2SO_4$ solution and the product solution was extracted with diethyl ether. The collected organic fractions were dried over magnesium sulfate and the solvent was evaporated under reduced pressure. Compound S4 was purified by column chromatography (gradient elution from 5:1 to 3:1) as a yellow oil (4.9 g, 60% yield).

n-BuLi (2.2 mL, 5.5 mmol, 1.1 equiv, 2.5 M in hexanes) was added dropwise to the solution of aryl bromide (1.1 equiv, 0.3 M) in anhydrous THF at −78° C. under nitrogen. The reaction mixture was stirred at −78° C. for 1 h, then compound S4 (821 mg, 5.0 mmol, 1.0 equiv) was added dropwise. The mixture was gradually warmed to room temperature and was stirred overnight. After completion, aqueous HCl (1 M, 10 mL) was added to the reaction mixture with vigorous stirring for 10 min. Then the resulting mixture was transferred to a separatory funnel and extracted with EtOAc (4×20 mL). The combined organic layers were dried over magnesium sulfate and concentrated under reduced pressure. Purification by column chromatography afforded ligands L as a mixture of cyclopentadiene isomers, which were used in the next step without further purification.

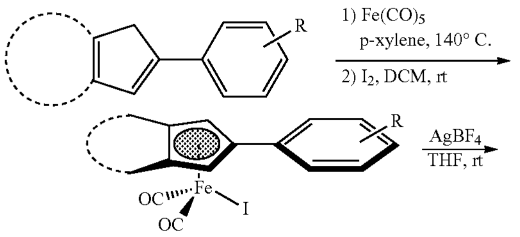

-continued

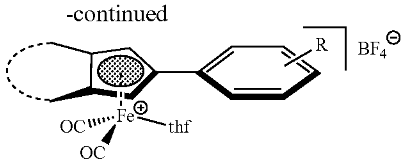

A solution of ligand (2.4-3.7 mmol, 1.0 equiv, 0.5 M) and pentacarbonyliron (0) (3.0 equiv) in p-xylene was thoroughly deoxygenated and heated at reflux under nitrogen for 20 h. Then the mixture was cooled to room temperature, the solvent was removed by rotary evaporation. The residue was dissolved in CH2Cl2 (0.2 M) and was treated with iodine (1.0 equiv). After stirring at room temperature for 2 h, the mixture was filtered through a pad of celite to remove insoluble solid material. The filtrate was washed with saturated Na2SO3 solution (5×5 mL). The organic layer was dried over magnesium sulfate and concentrated in vacuo. Column chromatography on silica gel or recrystallization afforded the iron-iodide complex.

A flame-dried flask was charged with iron-iodide complex (0.5 or 1.0 mmol, 1.0 equiv, 0.2 M), $AgBF_4$ (1.0 equiv) and anhydrous THF in an argon-filled glovebox. The reaction mixture was stirred at room temperature for 6 h. After completion, the solvent was removed by rotary evaporation. The residue was dissolved in dry $CH_2Cl_2$ (10 mL) and filtered through a pad of celite to remove silver iodide. The catalysts were obtained with two methods depending on the feasibility of recrystallization.

Method A: The filtrate was concentrated until approximately 1 mL of $CH_2Cl_2$ remained, then dry diethyl ether (10 mL) was added until large amounts of crystalline material were precipitated. The crystals were collected by vacuum filtration, washed with dry diethyl ether, and dried in vacuo for 10 min.

Method B: The solvent of the filtrate was removed under reduced pressure. Dry diethyl ether (5 mL) was added to wash the residue and was decanted. This step was repeated five times. The residual solvent was removed in vacuo for 30 min. Work-up and purification before drying under vacuum should be carried out as quickly as possible, preferably within 15 min.

Example 3—Procedure for Application of Aldehyde Addition

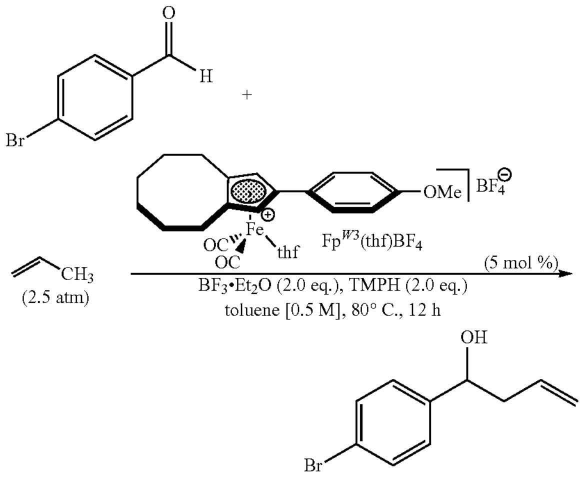

To an oven-dried Schlenk flask (100 mL, Chemglass, item #AF-0094-02) charged with a magnetic stir bar, $Fp^{W3}$(thf) $BF_4$ (79 mg, 5 mol %), 4-bromobenzaldehyde (555 mg, 3.0 mmol, 1.0 equiv), dry toluene (6 mL), $BF_3 \cdot Et_2O$ (740 µL, 6.0 mmol, 2.0 equiv), TMPH (1.0 mL, 6.0 mmol, 2.0 equiv) were added in succession in an argon-filled glovebox. The flask was sealed with a knob and was cooled in liquid nitrogen. After the whole reaction mixture was frozen, the flask was placed under vacuum for 10 min. Then propylene gas (207 mL, 2.9 equiv, 2.5 atm at 80° C., initial pressure) was condensed into the flask through the side arm from a plastic syringe. The liquid nitrogen was removed and the flask was resealed. After warming up to room temperature, the flask was heated at 80° C. for 12 h with vigorous stirring. The crude mixture was concentrated in vacuo and purified by flash column chromatography on silica gel to obtain the desired product in 76% yield.

What is claimed is:

1. A cationic cyclopentadienyliron dicarbonyl complex according to the general structure (I):

(I)

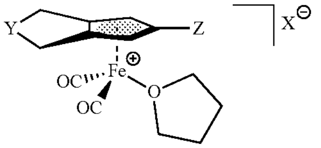

wherein, Y is $(CH_2)_n$ or $(CH_2)_mA(CH_2)_n$, A is O, $NSO_2R$, S, or $CR_1R_2$, each of R, $R_1$ and $R_2$ with respect to A is independently alkyl or aryl, or $CF_3$, n is an integer from 1 to 8, m+n is an integer from 2 to 7, Z is alkyl, unsubstituted or substituted aryl, heteroaryl, or $CF_3$, and X is $BF_4^-$, $ClO_4^-$, $PF_6^-$, $AsF_6^-$, or $SbF_6^-$.

2. The complex of claim 1, wherein R with respect to A is $CH_3$, or $p\text{-}C_6H_4CH_3$, or $CF_3$.

3. The complex of claim 1, wherein each of $R_1$ and $R_2$ with respect to A is independently $CH_3$, $CH_2CH_3$, $CH(CH_3)_2$, $C(CH_3)_3$, or $C_6H_5$.

4. The complex of claim 1, wherein Z is $-CH_3$, $-CH_2CH_3$, $-CH(CH_3)_2$, -cyclohexyl, -phenyl, -4-methoxyphenyl, -4-(trifluoromethyl)phenyl), -2-furyl, or -2-thiophenyl.

5. The complex of claim 1, wherein Y is $(CH_2)_2$.

6. A cyclopentadienyliron dicarbonyl product of the general structure (III):

(III)

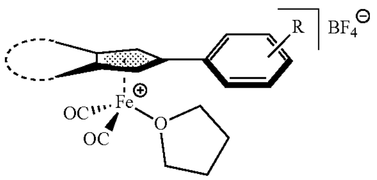

wherein R in structure III is 4-MeO, 2-Me-4-MeO, 3,5-$Me_2$, 3,5-$Me_2$-4-MeO, or 2,6-$Me_2$.

7. A method of preparing a cyclopentadienyliron dicarbonyl product, of the general structure (III):

(III)

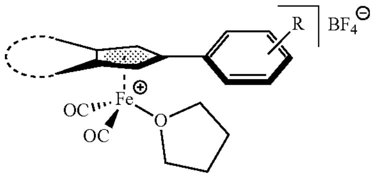

wherein R in structure III is 4-MeO, 2-Me-4-MeO, 3,5-$Me_2$, 3,5-$Me_2$-4-MeO, or 2,6-$Me_2$, comprising the steps of:

preparing a solution of ligand and iron carbonyl in hydrocarbon solvent;

deoxygenating and heating at reflux the solution;

removing the solvent from the solution to yield a residue;

treating the residue with iodine to form a mixture;

filtering the mixture to remove insoluble solid material to produce a filtrate;

reacting an iron-iodide complex, $AgBF_4$ and anhydrous THF to form a reaction mixture; and removing solvent from the reaction mixture and obtaining the general structure (III).

8. The method of claim 7, wherein the iron carbonyl is selected from the group consisting of $Fe(CO)_5$, $Fe_2(CO)_9$, $Fe_3(CO)_{12}$.

9. The method of claim 7, wherein the iron carbonyl is pentacarbonyliron.

10. The method of claim 7, wherein the hydrocarbon solvent is selected from the group consisting of p-xylene, toluene, mesitylene, and mixtures and blends thereof.

11. The method of claim 7, wherein the filtrate is saturated $Na_2SO_3$ or $Na_2S_2O_4$ solution.

12. The method of claim 7, further comprises column chromatography on silica gel or recrystallization to provide the iron-iodide complex.

* * * * *